(12) United States Patent
Neet et al.

(10) Patent No.: US 9,502,944 B2
(45) Date of Patent: Nov. 22, 2016

(54) COMPONENT FOR AN ELECTRIC MACHINE

(71) Applicant: REMY TECHNOLOGIES, L.L.C., Pendleton, IN (US)

(72) Inventors: Kirk Neet, Pendleton, IN (US); David Maley, Anderson, IN (US); Scott Bitzer, Fishers, IN (US); Chad Zook, Anderson, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 513 days.

(21) Appl. No.: 14/021,797

(22) Filed: Sep. 9, 2013

(65) Prior Publication Data

US 2015/0069883 A1    Mar. 12, 2015

(51) Int. Cl.
*H02K 9/00* (2006.01)
*H02K 9/06* (2006.01)
*H02K 1/24* (2006.01)

(52) U.S. Cl.
CPC ............ *H02K 9/06* (2013.01); *H02K 1/243* (2013.01)

(58) Field of Classification Search
CPC .......................... H02K 9/06; H02K 1/243
See application file for complete search history.

(56) References Cited

U.S. PATENT DOCUMENTS

| | | | |
|---|---|---|---|
| 2,581,872 A | 1/1952 | Morrison | |
| 2,588,175 A | 3/1952 | Stewart et al. | |
| 2,654,529 A | 10/1953 | Smith | |
| 4,686,399 A * | 8/1987 | Imori | H02K 9/06 310/263 |
| 4,826,405 A | 5/1989 | Robb | |
| 4,961,016 A | 10/1990 | Peng et al. | |
| 5,693,992 A * | 12/1997 | Kurusu | F04D 29/282 310/263 |
| 5,944,497 A * | 8/1999 | Kershaw | F04D 25/082 417/368 |
| 6,462,440 B1 * | 10/2002 | Asao | H02K 1/243 310/51 |
| 6,707,181 B1 | 3/2004 | Militello et al. | |
| 7,358,630 B2 * | 4/2008 | Vasilescu | F04D 29/281 310/58 |
| 7,365,471 B2 | 4/2008 | Creviston et al. | |
| 7,385,322 B2 | 6/2008 | Park | |
| 8,847,446 B2 | 9/2014 | Maley | |
| 2002/0076341 A1 | 6/2002 | Morelli | |
| 2003/0042806 A1 | 3/2003 | Inaba et al. | |
| 2005/0285459 A1 | 12/2005 | Ishida et al. | |
| 2006/0250033 A1 * | 11/2006 | Vasilescu | F04D 29/282 310/62 |
| 2007/0024131 A1 | 2/2007 | Rouleau et al. | |
| 2009/0039719 A1 | 2/2009 | Nakamura | |
| 2011/0229358 A1 | 9/2011 | Streng et al. | |
| 2011/0316369 A1 | 12/2011 | Neet et al. | |
| 2013/0113312 A1 * | 5/2013 | Maley | H02K 7/003 310/62 |
| 2013/0280086 A1 | 10/2013 | Chou | |
| 2014/0339964 A1 | 11/2014 | Bledsoe et al. | |

OTHER PUBLICATIONS

International Search Report and Written Opinion for PCT Application No. PCT/US2014/038045, dated Sep. 12, 2014, pp. 1-11.

* cited by examiner

*Primary Examiner* — Dang Le
(74) *Attorney, Agent, or Firm* — Cantor Colburn LLP

(57) ABSTRACT

An electric machine component includes a rotor assembly having a body provided with a number of pole members and a central hub. The body includes at least one mounting member projecting radially outwardly of the central hub. A fan member is mounted to the rotor. The fan member includes a hub portion and a number of fan blades projecting radially outwardly from the hub portion. The fan member includes at least one mounting element extending radially outwardly of the hub portion. The at least one mounting element is configured and disposed to engage with the at least one mounting member to radially and axially constrain the fan member to the rotor.

15 Claims, 5 Drawing Sheets

COMPONENT FOR AN ELECTRIC MACHINE

BACKGROUND OF THE INVENTION

Exemplary embodiments pertain to the art of electric machines and, more particularly, to a component for an electric machine.

Many electric machines include a stator and a rotor that are shifted relative to one another to create an electromotive force. In many cases, a fan is mounted relative to the rotor. In operation, the rotor spins the fan which, in turn, provides a cooling airflow to the electric machine. At present, the particular mounting of the fan to the rotor creates limitations on electric machine size. More specifically, mounting the fan to the rotor requires certain mounting structures on both components. As electric machines become smaller, pulleys and other components are mounted closer to the rotor. The particular structure required for mounting the fan limits the distance that the pulley, or other such components, can be mounted relative to the rotor.

BRIEF DESCRIPTION OF THE INVENTION

Disclosed is an electric machine component including a rotor assembly having a body provided with a number of pole members and a central hub. The body includes at least one mounting member projecting radially outwardly of the central hub. A fan member is mounted to the rotor. The fan member includes a hub portion and a number of fan blades projecting radially outwardly from the hub portion. The fan member includes at least one mounting element extending radially outwardly of the hub portion. The at least one mounting element is configured and disposed to engage with the at least one mounting member to radially and axially constrain the fan member to the rotor.

Also disclosed is an alternator including a housing, a stator fixedly mounted to the housing, and a rotor assembly rotatably mounted relative to the stator. The rotor assembly includes a body having a number of pole members and a central hub. The body includes a plurality of mounting members projecting radially outwardly of the central hub. A fan member is mounted to the rotor assembly. The fan member includes a hub portion and a number of fan blades that project outwardly from the hub portion. The fan member includes a plurality of mounting elements extending radially outwardly of the hub portion. The plurality of mounting elements is configured and disposed to engage with corresponding ones of the plurality of mounting members to radially and axially constrain the fan member to the rotor.

Further disclosed is a method of securing a fan member to a rotor assembly of an electric machine. The method includes positioning the fan member adjacent the rotor, aligning a plurality of mounting members extending radially outwardly of the central hub of the rotor assembly with a corresponding plurality of mounting elements extending radially inwardly of a hub portion of the fan member, and securing the plurality of mounting members to the plurality of mounting elements.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
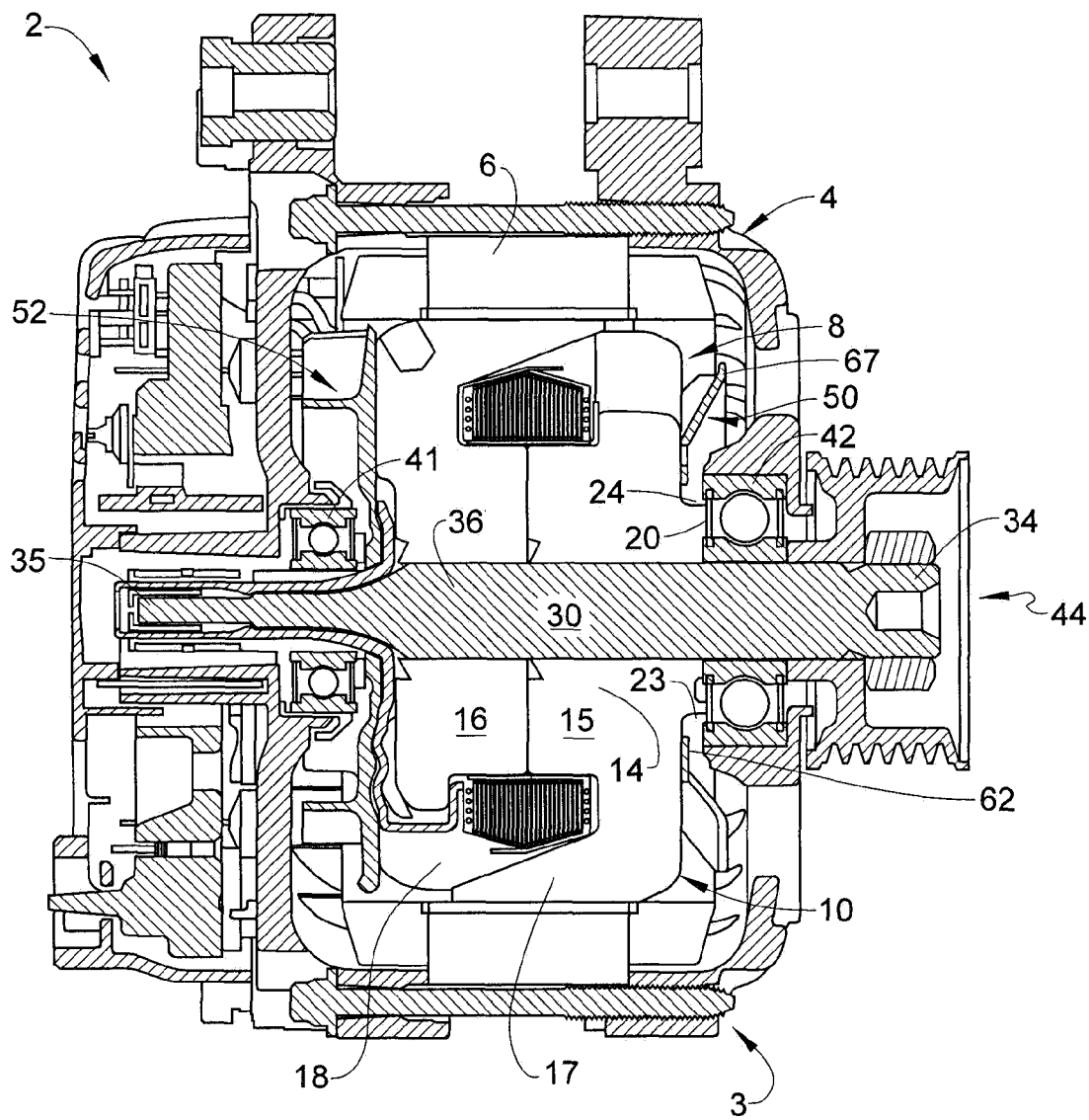
FIG. 1 depicts an electric machine including a rotor assembly and a fan member, in accordance with an exemplary embodiment.
Figure 2:
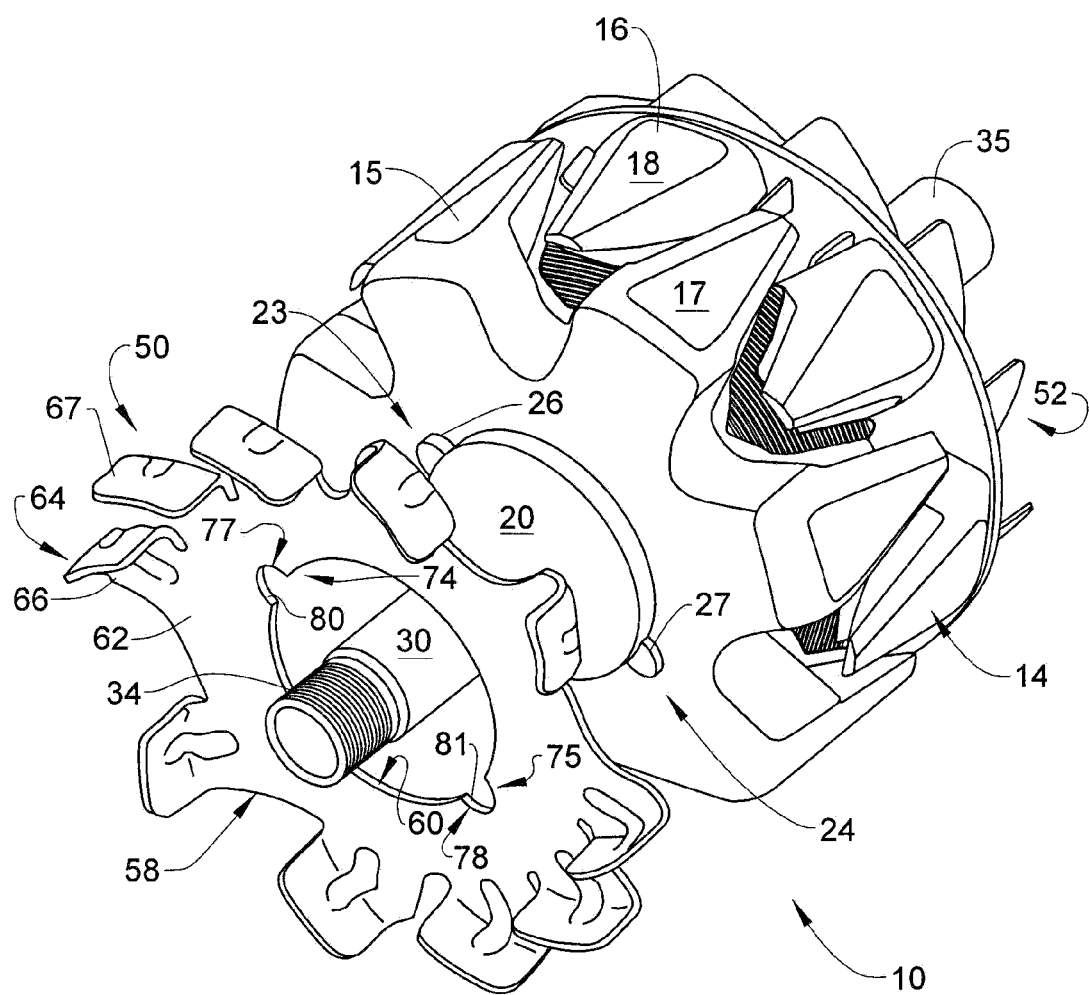
FIG. 2 depicts a partially disassembled perspective view of the rotor assembly and fan member of FIG. 1.
Figure 3:
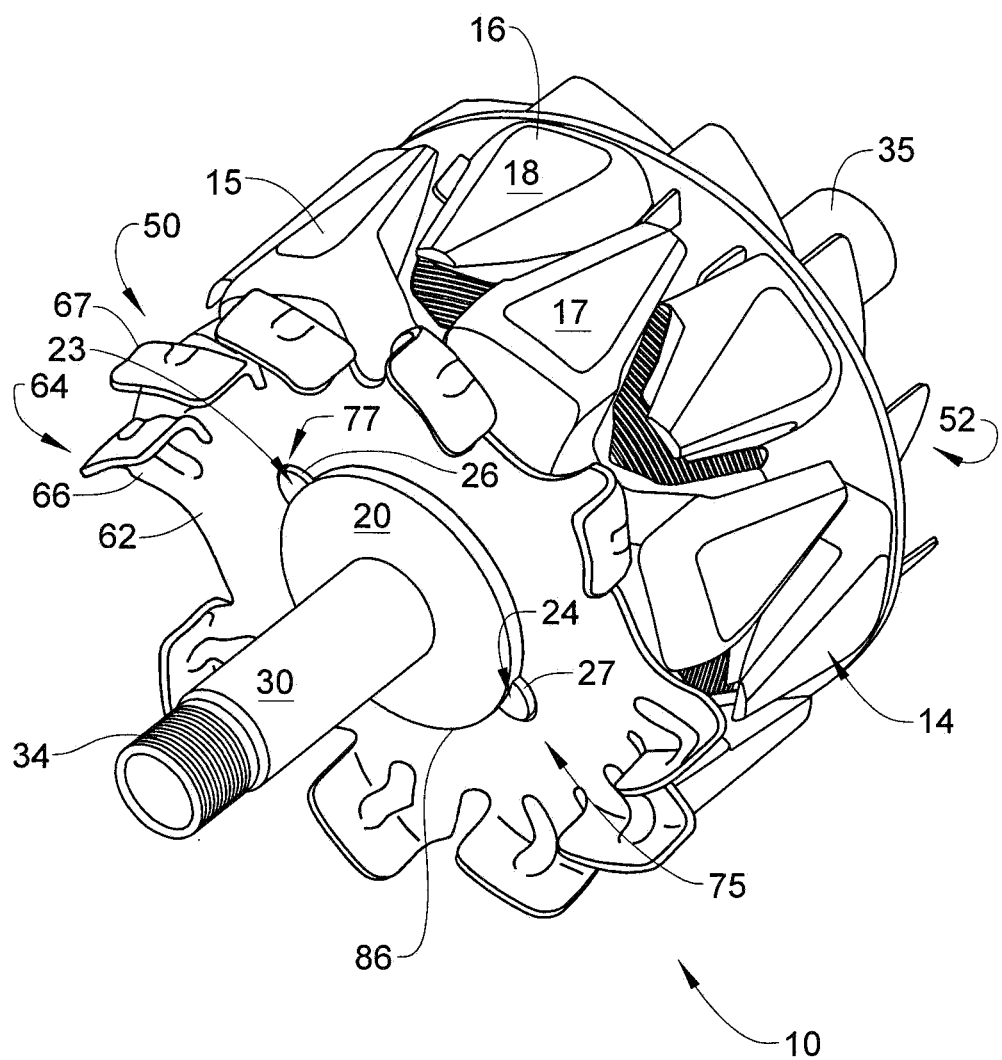
FIG. 3 depicts an assembled perspective view of the rotor assembly and fan member of FIG. 2.

With reference to FIGS. 1-3, an electric machine, constructed in accordance with an exemplary embodiment, is indicated generally at 2. Electric machine 2 is shown in the form of an alternator 3 and includes a housing 4 within which is arranged a stator 6 and a rotor assembly 8. Rotor assembly 8 rotates relative to stator 6 and includes a rotor 10 having a body 14. Body 14 includes a first half or claw pole portion 15 and a second half or claw pole portion 16. Each claw pole portion 15 and 16 includes a corresponding plurality of pole members, one of which is indicated at 17, on first claw pole portion 15 and at 18 on second claw pole portion 16. In the exemplary embodiment shown, the plurality of pole members 17 on first claw pole portion 15 represents half of a total number of pole members for rotor 10 and the plurality of pole members 18 on second claw pole portion 16 represents another half of the total number of pole members of rotor 10.

Rotor 10 includes a central hub 20 and a first projection or mounting member 23 and a second projection or mounting member 24. In the exemplary embodiment shown, first mounting member 23 is arranged substantially directly opposite to second mounting member 24. As will become more fully evident below, first and second mounting members 23 and 24 extend radially outwardly from central hub 20. First and second mounting members 23 and 24 project axially outwardly from first claw pole portion 15 and may include curvilinear outer sides 26 and 27 respectively. It should be evident to those skilled in the art that the shape of the mounting members 23 and 24 may take other forms including rectangular, triangular and the like. Mounting members 23 and 24 may also take the form of a slight radial bulge. Mounting members 23 and 24 extend from first claw pole portion 15 and may terminate prior to an outer edge (not separately labeled) of central hub 20, may extend beyond the outer edge of central hub 20, or may be coplanar with the outer edge of central hub 20.

In the exemplary embodiment shown, curvilinear outer sides 26 and 27 are substantially semi-circular. Rotor 10 is also shown to include a shaft 30 that extends through first and second claw pole portions 15 and 16. Shaft 30 extends from a first end 34 to a second end 35 through an intermediate portion 36. Intermediate portion 36 is rotatably supported to housing 4 by first and second bearings 41 and 42. A sheave or pulley 44 is mounted to first end 34 of shaft 30. Pulley 44 is configured to drive or be driven by a belt (not shown). Rotor 10 is further shown to include a fan member 50 arranged adjacent first claw pole portion 15 and a fan component 52 arranged adjacent second claw pole portion 16. Fan member 50 and fan component 52 are configured to generate a cooling air flow through housing 4.

In accordance with an exemplary embodiment, fan member 50 includes a body portion 58 having a hub portion 60 that is surrounded by a substantially planar portion 62. Fan member 50 includes a plurality of fan blades, one of which is indicated at 64, that projects radially outwardly from body portion 58. Each fan blade 64 includes a first portion 66 and a second portion 67. Second portion 67 is angled relative to first portion 66. Fan member 50 includes a first mounting element 74 and a second mounting element 75. Mounting elements 74 and 75 take the form of first and second notches 77 and 78 respectively. Each notch 77 and 78 extends radially outwardly from hub portion 60 into substantially planar portion 62. Each notch 77 and 78 includes a corresponding discontinuous edge 80 and 81 that create respective interruptions (not separately labeled) in hub portion 60. In the exemplary embodiment shown, first and second discontinuous edges 80 and 80 are curvilinear. In accordance with an aspect of the exemplary embodiment, first and second discontinuous edges 80 and 81 are substantially semi-circular.

In this manner, fan member 50 is positioned at first claw pole portion 15 such that hub portion 60 registers with central hub 20. In accordance with an aspect of the exemplary embodiment, a gap 86 is arranged between central hub 20 and hub portion 60 when fan member 50 is in place. Gap 86 establishes a moat that traps any varnish that might be present on rotor 10. That is, gap 86 inhibits varnish from migrating into central hub 20 or along shaft 30 which could create a loose fit at bearing 42 or at pulley 44. First and second mounting elements 74 and 75 are receptive of first and second mounting members 23 and 24. Mounting members 23 and 24 constrain radial movement of fan member 50 relative to first claw pole portion 15. Once in position, first and second mounting members 23 and 24 are staked by applying a force to the mounting members 23 and 24. Staking results in an outward expansion of first and second mounting members 23 and 24 that creates a mechanical bond with fan member 50. The mechanical bond causes the fan member 50 to be axially constrained relative to first claw portion 15.

Figure 4:
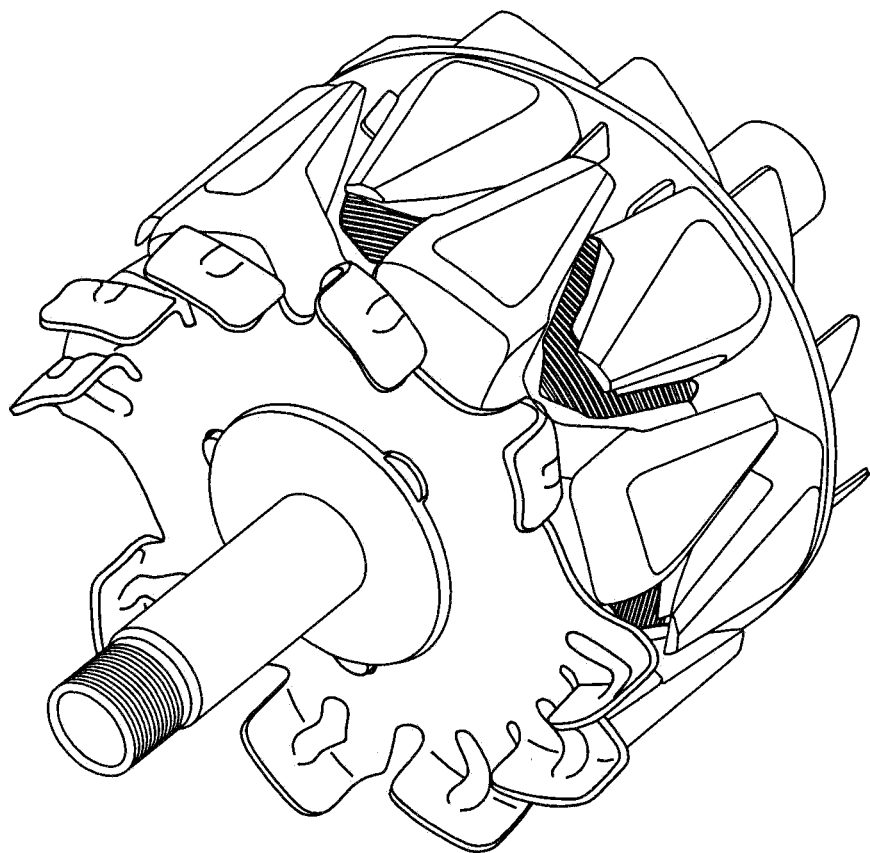
FIG. 4 depicts an assembled perspective view of a rotor assembly and fan member, in accordance with another aspect of the exemplary embodiment.
Figure 5:
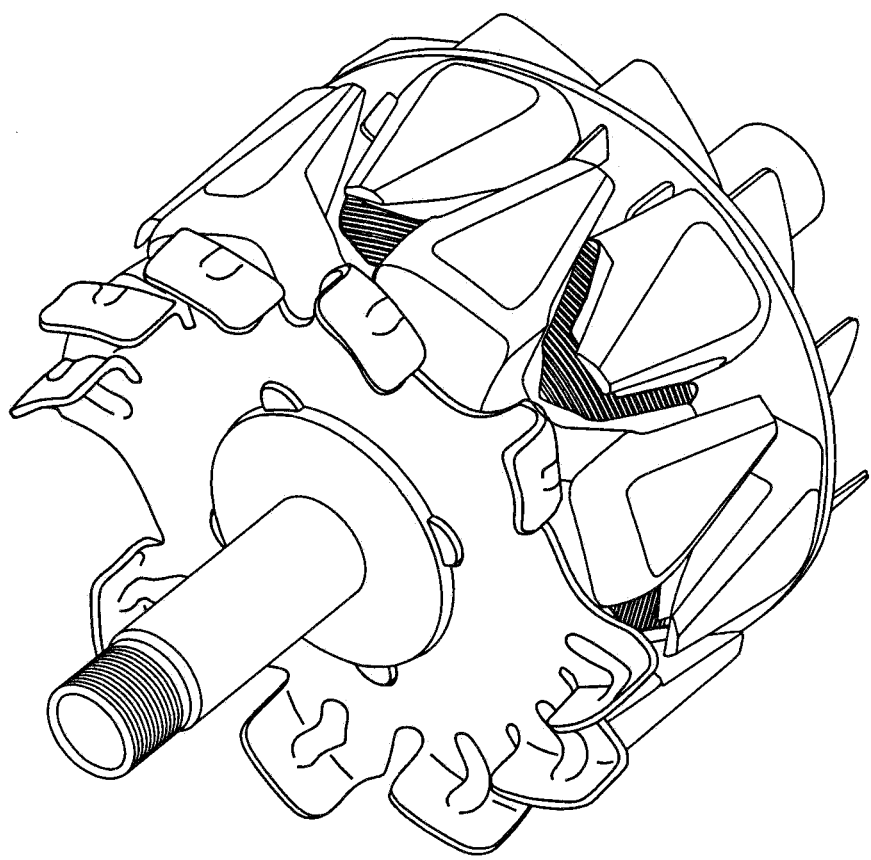
FIG. 5 depicts an assembled perspective view of a rotor assembly and fan member, in accordance with yet another aspect of the exemplary embodiment.

At this point it should be apparent that by forming the mounting members into the central hub, tooling and production costs can be reduced. Further, by forming the mounting members at the central hub, the number and size of connection points can be reduced. It should also be understood that the number and location of mounting members and corresponding mounting elements can vary. FIG. 4 shows an electric machine with three mounting elements and three mounting members; FIG. 5 shows an electric machine with four mounting elements and four mounting members. By minimizing the number of connections between the fan member and the rotor, and by eliminating raised portions about the connection zones, the rotor assembly has a shorter axial dimension. The shorter axial dimension enables electric machine 2 to be formed having a more compact form factor.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine component comprising:
    a rotor assembly including a body having a number of pole members and a central hub, the body including at least one mounting member projecting radially outwardly of the central hub; and
    a fan member mounted to the rotor assembly, the fan member including a hub portion and a number of fan blades that project radially outwardly from the hub portion, the fan member including at least two mounting elements extending radially outwardly of the hub portion, the at least two mounting members being configured and disposed to engage with the at least one mounting member to radially and axially constrain the fan member to the rotor.

2. The electric machine component according to claim 1 wherein the at least two mounting elements comprises at least two notches having a discontinuous edge formed in the hub portion.

3. The electric machine component according to claim 1, wherein each of the at least two notches includes a curvilinear edge.

4. The electric machine component according to claim 3, wherein the curvilinear edge is semi-circular.

5. The electric machine component according to claim 1, wherein the at least two mounting members comprise at least three mounting members and the at least two mounting elements comprise at least three mounting elements.

6. The electric machine component according to claim 1, wherein the at least two mounting members comprise at least four mounting members and the at least two mounting elements comprise at least four mounting elements.

7. The electric machine component according to claim 1, further comprising: a gap arranged between the hub portion and the central hub when the at least two mounting members are engaged with the at least two mounting elements.

8. An alternator comprising:
    a housing;
    a stator fixedly mounted to the housing;
    a rotor assembly rotatably mounted relative to the stator, the rotor assembly including a body having a number of pole members and a central hub, the body including a plurality of mounting members projecting radially outwardly of the central hub; and
    a fan member mounted to the rotor assembly, the fan member including a hub portion and a number of fan blades that project outwardly from the hub portion, the fan member including a plurality of mounting elements extending radially outwardly of the hub portion, the plurality of mounting elements being configured and disposed to engage with corresponding ones of the plurality of mounting members to radially and axially constrain the fan member to the rotor.

9. The alternator according to claim 8, wherein the plurality of mounting members comprise at least two mounting members and the plurality of mounting elements comprise at least two mounting elements.

10. The alternator according to claim 8, further comprising: a gap arranged between the hub portion and the central hub when the plurality of mounting members are engaged with the plurality of mounting elements.

11. The alternator according to claim 8, wherein the plurality of mounting elements comprise a plurality of notches having a discontinuous edge formed in the hub portion.

12. The alternator according to claim 11, wherein each of the plurality of notches include a curvilinear edge.

13. The alternator according to claim 12, wherein the curvilinear edge is semi-circular.

14. The alternator according to claim 8, wherein the plurality of mounting members comprise at least three mounting members and the plurality of mounting elements comprise at least three mounting elements.

15. The alternator according to claim 8, wherein the plurality of mounting members comprise at least four mounting members and the plurality of mounting elements comprise at least four mounting elements.

\* \* \* \* \*